United States Patent [19]
Kawakami

[11] Patent Number: 5,832,782
[45] Date of Patent: Nov. 10, 1998

[54] BRAKE AND SHIFTING DEVICE

[75] Inventor: Tatsuya Kawakami, Sakai, Japan

[73] Assignee: Shimano, Inc., Osaka, Japan

[21] Appl. No.: 909,772

[22] Filed: Aug. 12, 1997

Related U.S. Application Data

[63] Continuation of Ser. No. 652,142, May 17, 1996, abandoned.

[30] Foreign Application Priority Data

May 26, 1995 [JP] Japan ................................. 7-152450

[51] Int. Cl.⁶ ........................... B60K 41/26; B62K 23/06; B62M 25/04
[52] U.S. Cl. ...................... 74/473.13; 74/489; 74/502.2; 116/28.1; 192/4 R
[58] Field of Search ................... 74/475, 489, 502.2, 74/473.13, 473.14; 192/4 R; 116/28.1

[56] References Cited

U.S. PATENT DOCUMENTS

| | | | |
|---|---|---|---|
| 4,100,820 | 7/1978 | Evertt | 74/489 |
| 4,319,673 | 3/1982 | Kojima | 192/4 R |
| 5,052,241 | 10/1991 | Nagano | 74/502.2 |
| 5,203,213 | 4/1993 | Nagano | 74/475 |
| 5,241,878 | 9/1993 | Nagano | 74/502.2 |
| 5,257,683 | 11/1993 | Romano | 74/489 X |
| 5,400,675 | 3/1995 | Nagano | 74/502.2 |
| 5,479,776 | 1/1996 | Romano | 74/489 X |
| 5,577,413 | 11/1996 | Tagawa et al. | 74/489 X |

FOREIGN PATENT DOCUMENTS

| | | | |
|---|---|---|---|
| 485863 | 5/1992 | European Pat. Off. | B62M 25/04 |
| 636539 | 2/1995 | European Pat. Off. | B62M 25/04 |
| 2-68289 | 5/1990 | Japan | B62L 3/02 |

OTHER PUBLICATIONS

European search report for EP 96303737.9, dated Jul. 2, 1997.

Primary Examiner—Allan D. Herrmann
Attorney, Agent, or Firm—James A. Deland

[57] ABSTRACT

A combined brake and shifting control device includes a brake lever housing, a brake lever pivotably coupled to the brake lever housing, a speed change housing, a ratchet mechanism disposed within the speed change housing, one or more shift levers coupled to the ratchet mechanism so that the ratchet mechanism rotates in response to movement of the shift lever(s), and a shaft coupled to the ratchet mechanism for rotation therewith. The speed change housing is attached to a brake lever housing so that the shaft extends outside the speed change housing and into the brake lever housing.

21 Claims, 17 Drawing Sheets

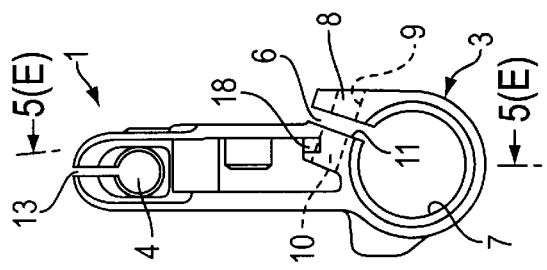
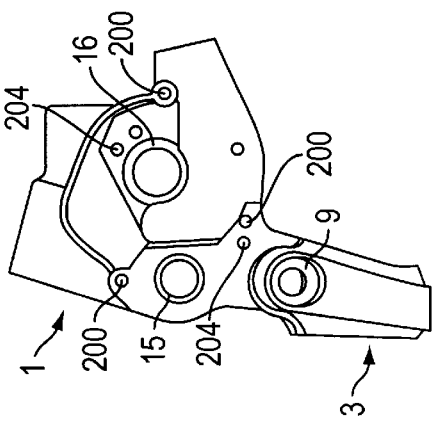
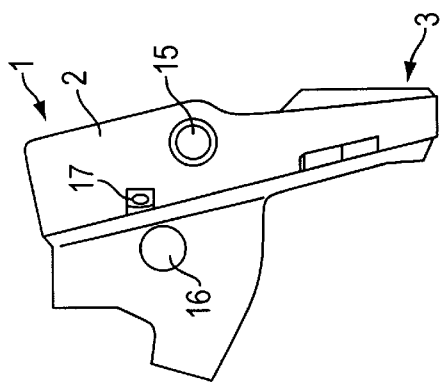
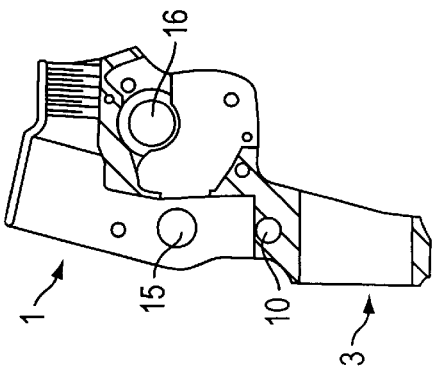
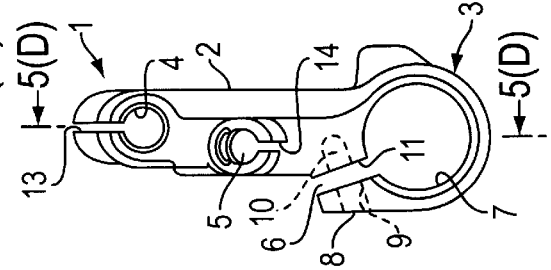
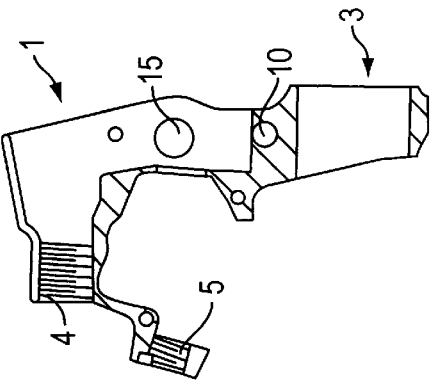

FIG. 8
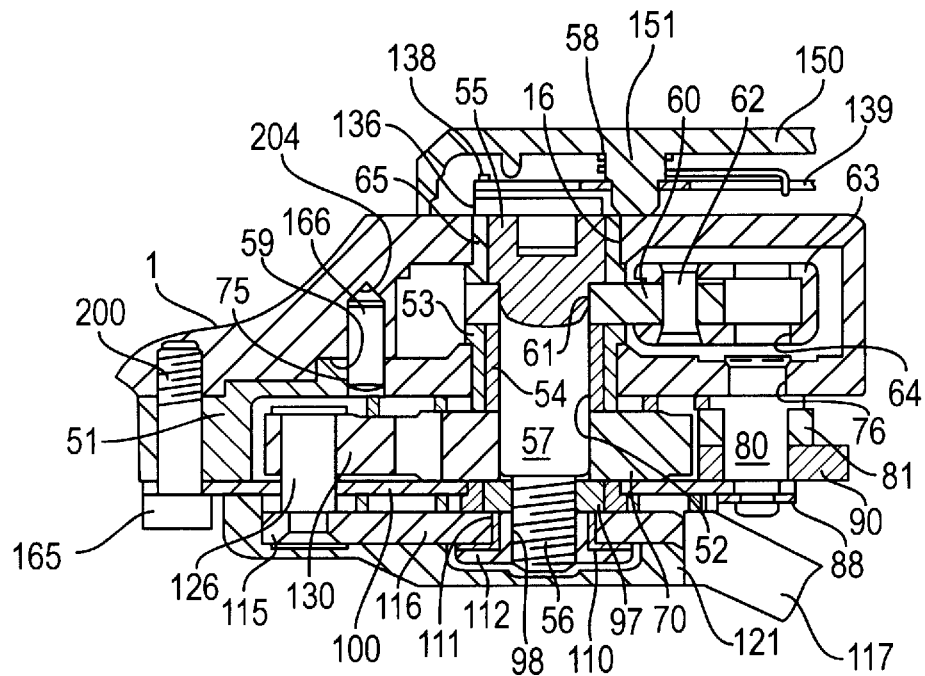
FIG. 10(A)
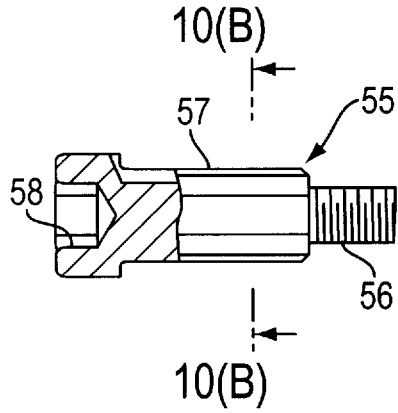
FIG. 10(B)

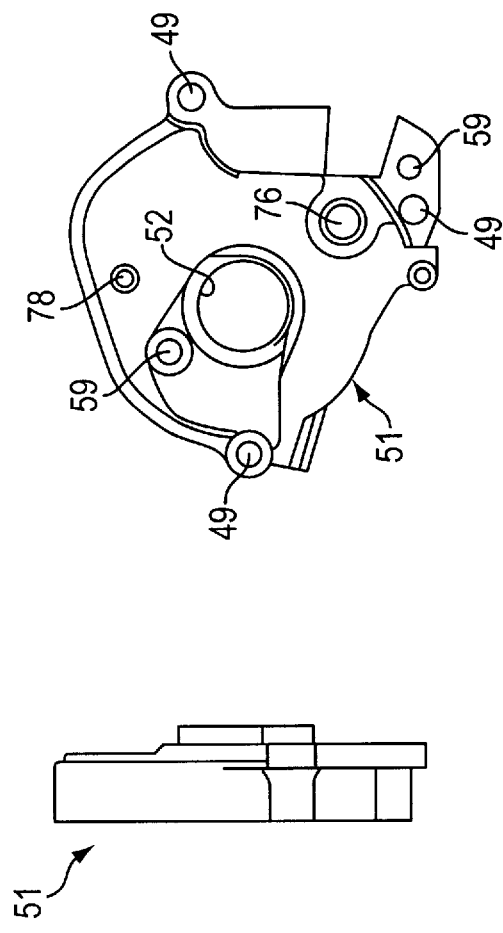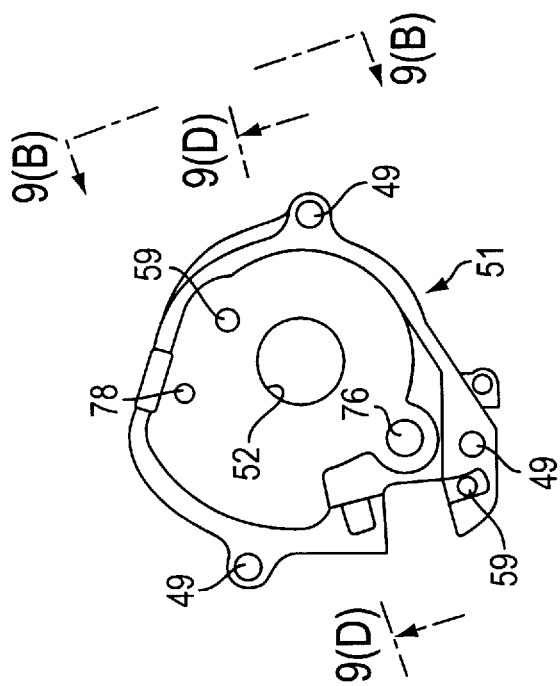

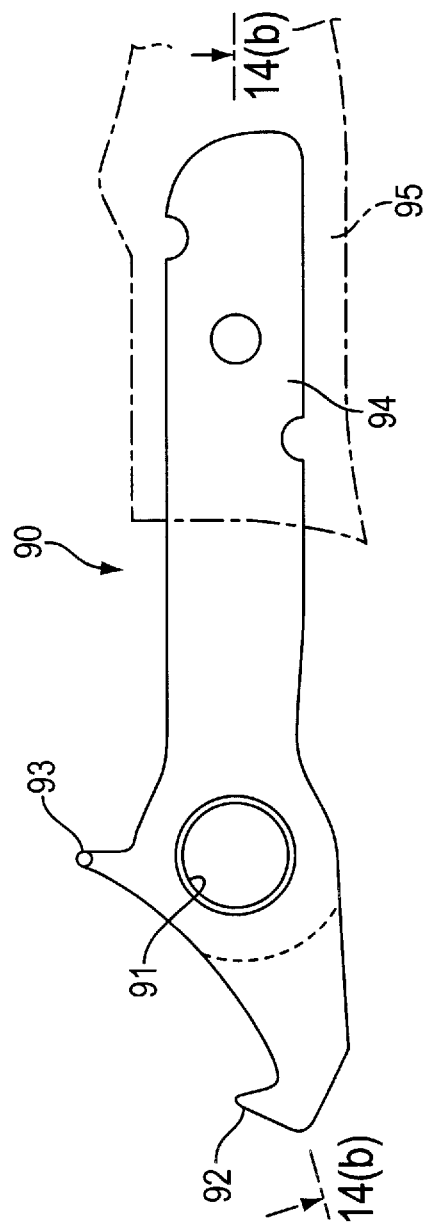
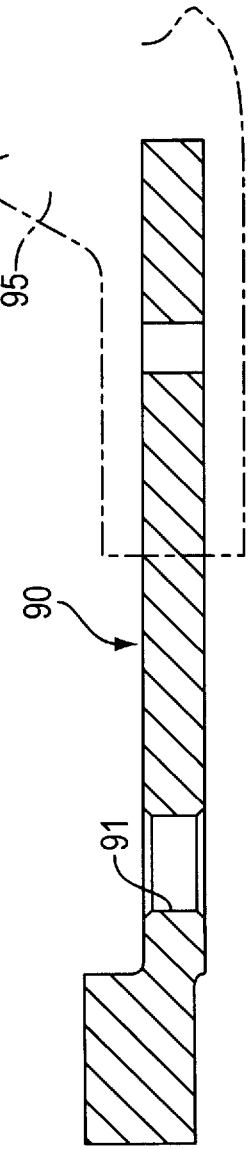
FIG. 14(A)
FIG. 14(B)

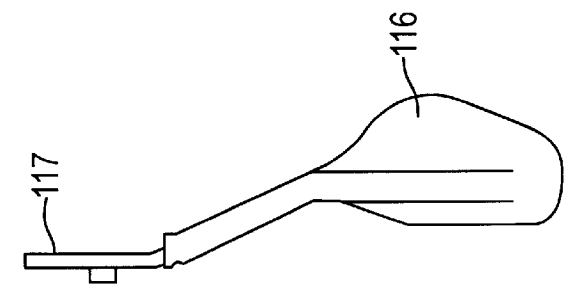
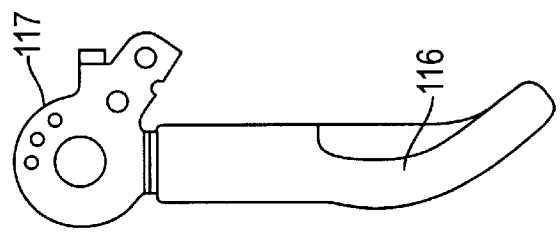
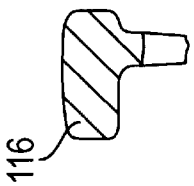
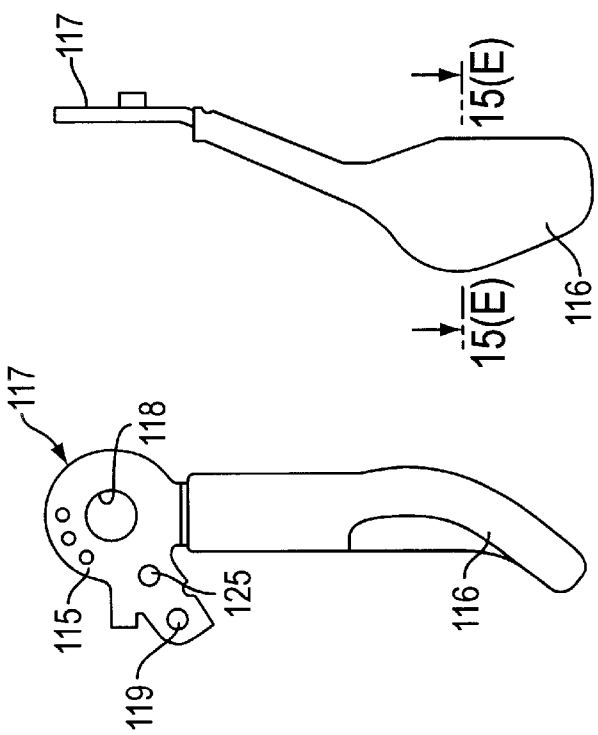

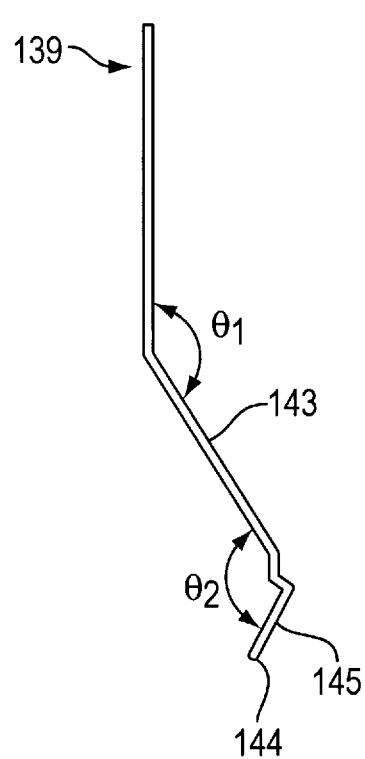
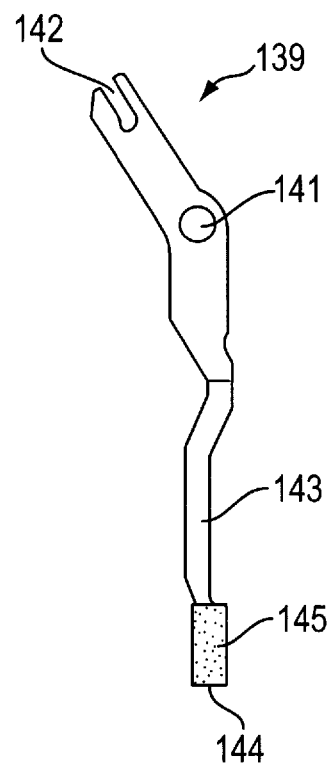
FIG. 18(A)
FIG. 18(B)

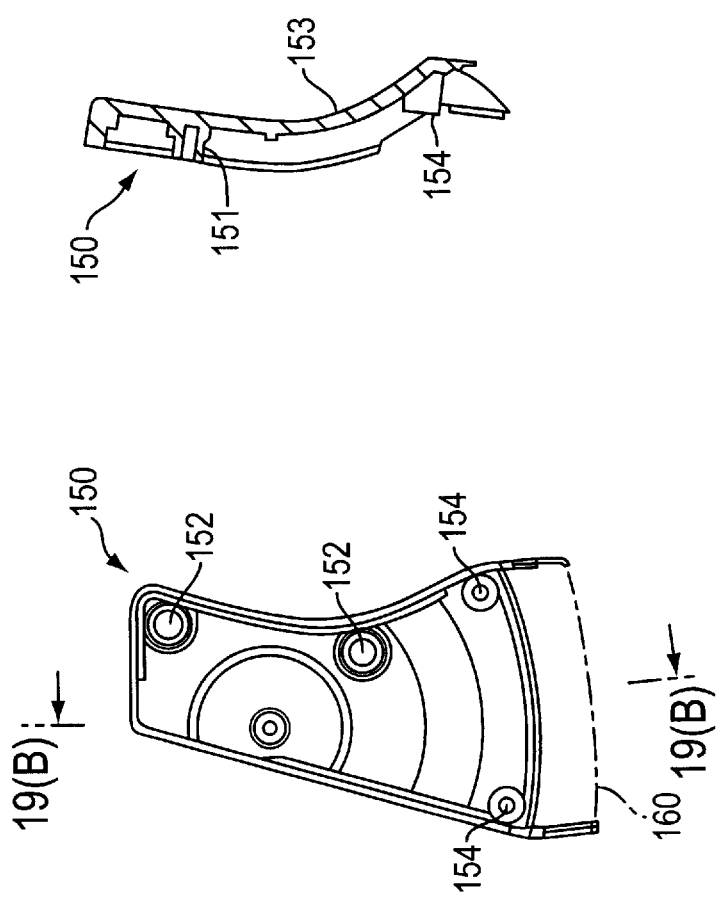

BRAKE AND SHIFTING DEVICE

This is a Continuation of application Ser. No. 08/652,142, filed May 17, 1996, now abandoned.

BACKGROUND OF THE INVENTION

The present invention is directed to bicycle brake and shifting control devices and, more particularly, to a combined bicycle brake and shifting control device wherein the brake and shifting control components are interchangeable while maintaining a compact structure for the combined unit.

Bicycle brake and shifting control devices ordinarily are mounted on the bicycle handlebar so that the cyclist may shift and brake while grasping the handlebar. It is known to integrate the shifting device with the brake device as shown in JP 2-68289 and U.S. Pat. Nos. 4,319,673, 5,241,878 and 5,400,675 in order to reduce the overall size of the two devices. However, the brake and shifting control devices in these patents are not modular and therefore cannot be interchanged with other brake and shifting control devices. It is also known to fasten the shifting control device directly to the brake control device bracket to achieve some reduction in the overall size of the two devices while allowing interchangeability. Such a structure is shown in U.S. Pat. Nos. 5,052,241 and 5,203,213. However, such structures still require separate cable receiving housings and separate housings capable of containing the entire structure of each device. Thus, such structures are still somewhat large, especially when the shifting control device includes ratchet mechanisms which require various ratchet pawls, springs and levers, all of which must be contained within the shift control device housing. Such structures can be unacceptable when competing on a selling or manufacturing cost basis.

SUMMARY OF THE INVENTION

The present invention is directed to a combined bicycle brake and shifting control device wherein the brake and shifting control components are interchangeable while maintaining a compact structure for the combined unit. In one embodiment of the present invention directed to the shifting control device alone, the shifting control device includes a speed change housing, a shift lever, and a shaft disposed within the speed change housing. The shaft is coupled to the shift lever for rotation in response to movement of the shift lever. The shaft extends through an outside surface of the speed change housing so that the shaft terminates in a free end outside the housing and spaced apart from the shift lever. If desired, a ratchet mechanism may be provided to couple the shift lever to the shaft, and the ratchet mechanism may be disposed within the speed change housing. This basic structure may be coupled to a brake lever housing so that the free end of the shaft is disposed within the brake lever housing to perform such functions as winding transmission cable and/or controlling a gear indicating device also disposed on the brake lever housing. To perform the former function, a wire winding member is disposed on the shaft outside the speed change housing. To perform the latter function, the free end of the shaft may include a coupling for transferring motion of the shaft to a speed indicating device.

In the more specific embodiment of the present invention directed to the combined brake and shifting control device, the combined device includes a brake lever housing, a brake lever pivotably coupled to the brake lever housing, a speed change housing, a ratchet mechanism disposed within the speed change housing, one or more shift levers coupled to the ratchet mechanism so that the ratchet mechanism rotates in response to movement of the shift lever(s), and a shaft coupled to the ratchet mechanism for rotation therewith and extending outside the speed change housing into the brake lever housing. In this embodiment the shift lever shaft has a wire winding member disposed thereon within the brake lever housing for controlling the winding and unwinding of a transmission cable. With this structure the brake lever bracket may comprise a band for fixing the brake lever housing to a bicycle, a first screw component for fixing a brake cable adjusting bolt to the brake lever housing, and a second screw component for fixing a transmission cable adjusting bolt to the brake lever housing. Thus, the screw components may be formed integrally with the brake lever bracket instead of being formed separately on the brake lever and speed change housings.

A speed indicator also may be fastened to the brake lever housing. In one embodiment the speed indicator comprises an indicator cover mounted to an opposite side of the brake lever housing. The indicator cover has an indicator cover projection extending toward the brake lever housing, and a display needle is pivotably coupled to the indicator cover projection. A cam plate is provided for transferring rotational motion of the shaft to the indicator needle. The cam plate includes a shaft coupler extending from one side thereof and coupled to the shaft for rotation therewith, and an indicator coupler extending from an opposite side thereof and fitted within a slit on the indicator needle.

BRIEF DESCRIPTION OF THE DRAWINGS

FIGS. 5(a) through 5(f) illustrate in detail a particular embodiment of a brake bracket used in the combined bicycle brake and shifting control device shown in FIG. 1, wherein FIG. 5(b) is an elevational view of the brake bracket; FIG. 5(a) is a left side view of the brake bracket shown in FIG. 5(b); FIG. 5(c) is a right side view of the brake bracket shown in FIG. 5(b); FIG. 5(d) is a cross sectional view taken along line 5(d)—5(d) in FIG. 5(a); FIG. 5(e) is a cross sectional view taken along line e—e in FIG. 5(c); and FIG. 5(f) is a reverse view of the brake bracket shown in FIG. 5(b);

FIG. 8 is a cross sectional view of the combined brake and shifting control device shown in FIG. 1;

FIGS. 9(a) through (d) illustrate in detail a particular embodiment of a base member for the shift unit shown in FIG. 1, wherein FIG. 9(a) is a plan view of the base member; FIG. 9(b) is a side view of the base member taken along line 9(b)—9(b) in FIG. 9(a); FIG. 9(c) is a reverse view of the base member shown in FIG. 9(a); and FIG. 9(d) is a cross sectional view of the base member taken along line 9(d)—9(d) in FIG. 9(a);

FIGS. 10(a) and (b) illustrate a particular embodiment of a shift lever shaft shown in FIG. 8, wherein FIG. 10(a) is partial cross sectional view of the shift lever shaft, and FIG. 10(b) is a cross sectional view of the shift lever shaft taken along line 10(b)—10(b) in Figure (a);

FIGS. 11 (a) and (b) illustrate a particular embodiment of a ratchet shown in FIG. 8, wherein

FIGS. 13(a) and (b) illustrate a particular embodiment of a positioning pawl shown in FIG. 8, wherein FIG. 13(a) is an elevational view of the positioning pawl.

FIGS. 14(a) and (b) illustrate a particular embodiment of a return lever shown in FIG. 8, wherein FIG. 14(a) is an elevational view of the positioning lever, and FIG. 14(b) is a cross sectional view of the positioning lever taken along line 14(b)—14(b) in FIG. 14(a);

FIGS. 15(a) through (e) illustrate a particular embodiment of a feeding lever shown in FIG. 4, wherein FIG. 15(a) is an elevational view of the feeding lever; FIG. 15(b) is a right side view of the feeding lever shown in FIG. 15(a); FIG. 15(c) is a reverse view of the feeding lever shown in FIG. 15(a); FIG. 15(d) is a left side view of the feeding lever shown in FIG. 15(a), and FIG. 15(e) is a cross sectional view of the feeding lever taken along line 15(e)—15(e) in Figure (b);

FIGS. 16(a) and (b) illustrate a particular embodiment of a feeding pawl shown in FIG. 8, wherein FIG. 16(a) is an elevational view of the feeding pawl.

FIGS. 17(a), (b), and (c) illustrate a particular embodiment of cam plate used with the speed indicator shown in FIG. 1, wherein FIG. 17(a) is a plan view of the cam plate.

FIGS. 18(a) and (b) illustrate a particular embodiment of a display needle used with the speed indicator shown in FIG. 1, wherein FIG. 18(b) is an elevational view of the display needle, and FIG. 18(a) is a side view of the display needle;

FIGS. 19(a), (b), and (c) illustrate a particular embodiment of a cover for the speed indicator shown in FIG. 1, wherein FIG. 19(c) is a plan view of the cover; FIG. 19(a) is a reverse view of the cover shown in FIG. 19(c); and FIG. 19(b) is a cross sectional view taken along line 19(b)—19(b) in FIG. 19(a);

DETAILED DESCRIPTION OF THE EMBODIMENTS

Overview

Figure 1:
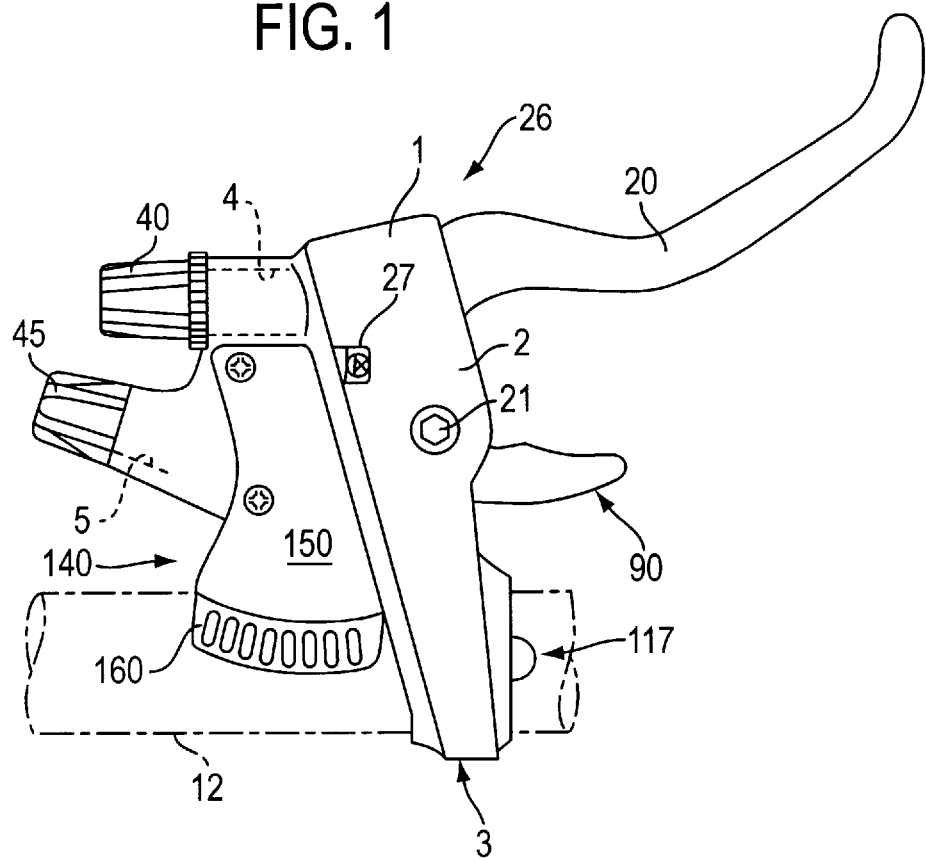
FIG. 1 is a top plan view of a particular embodiment of a combined bicycle brake and shifting control device according to the present invention.
Figure 2:
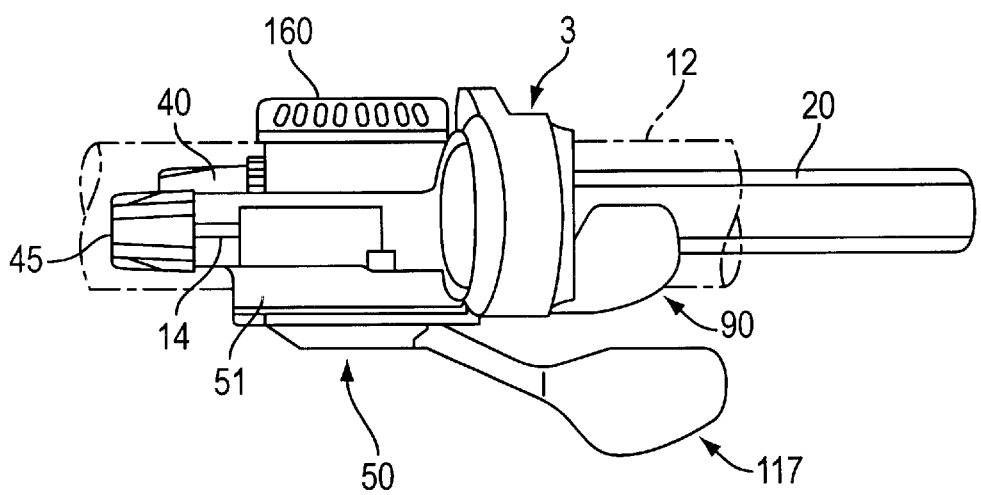
FIG. 2 is a rear elevational view of the combined bicycle brake and shifting control device shown in FIG. 1.
Figure 3:
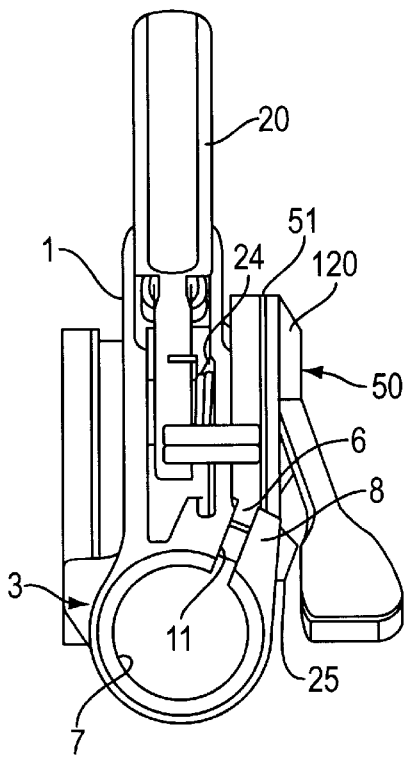
FIG. 3 is a right side view of the combined bicycle brake and shifting control device shown in FIG. 1.
Figure 4:
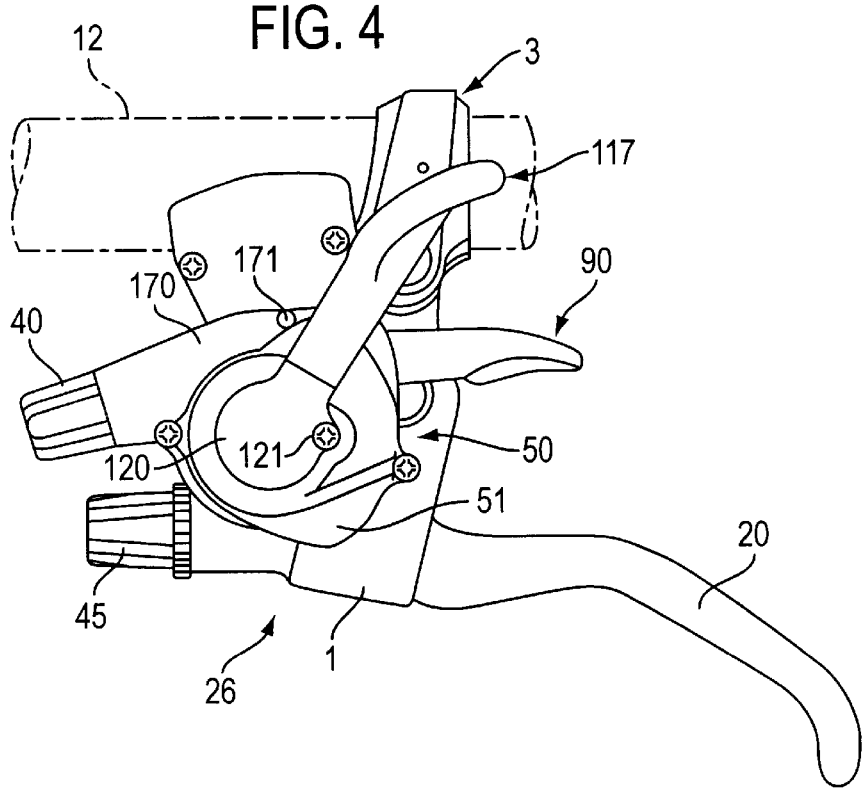
FIG. 4 is a bottom view of the combined bicycle brake and shifting control device shown in FIG. 1.
Figure 21:
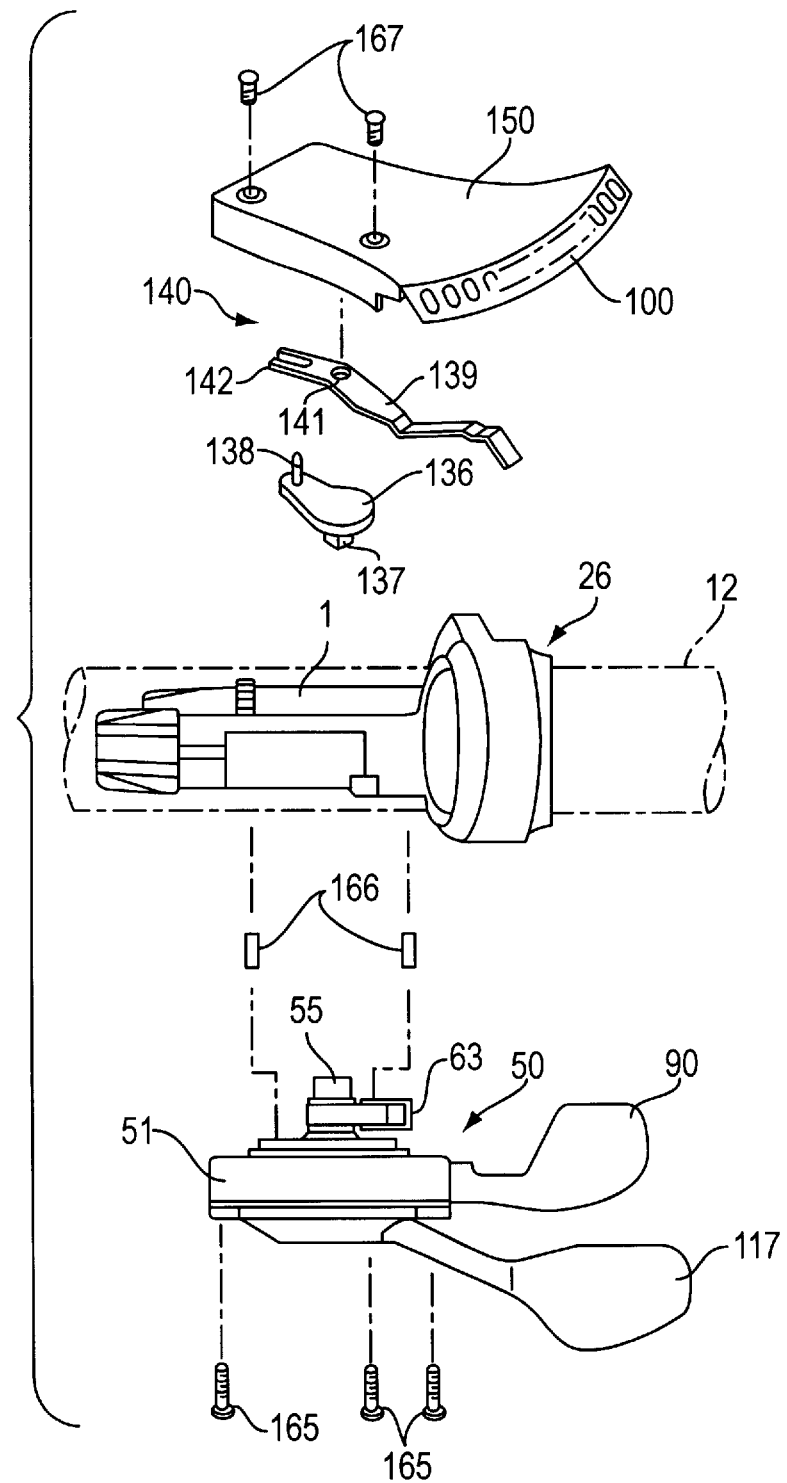
FIG. 21 is a partially exploded view of the combined bicycle brake and shifting control device shown in FIG. 1.
Figure 22:
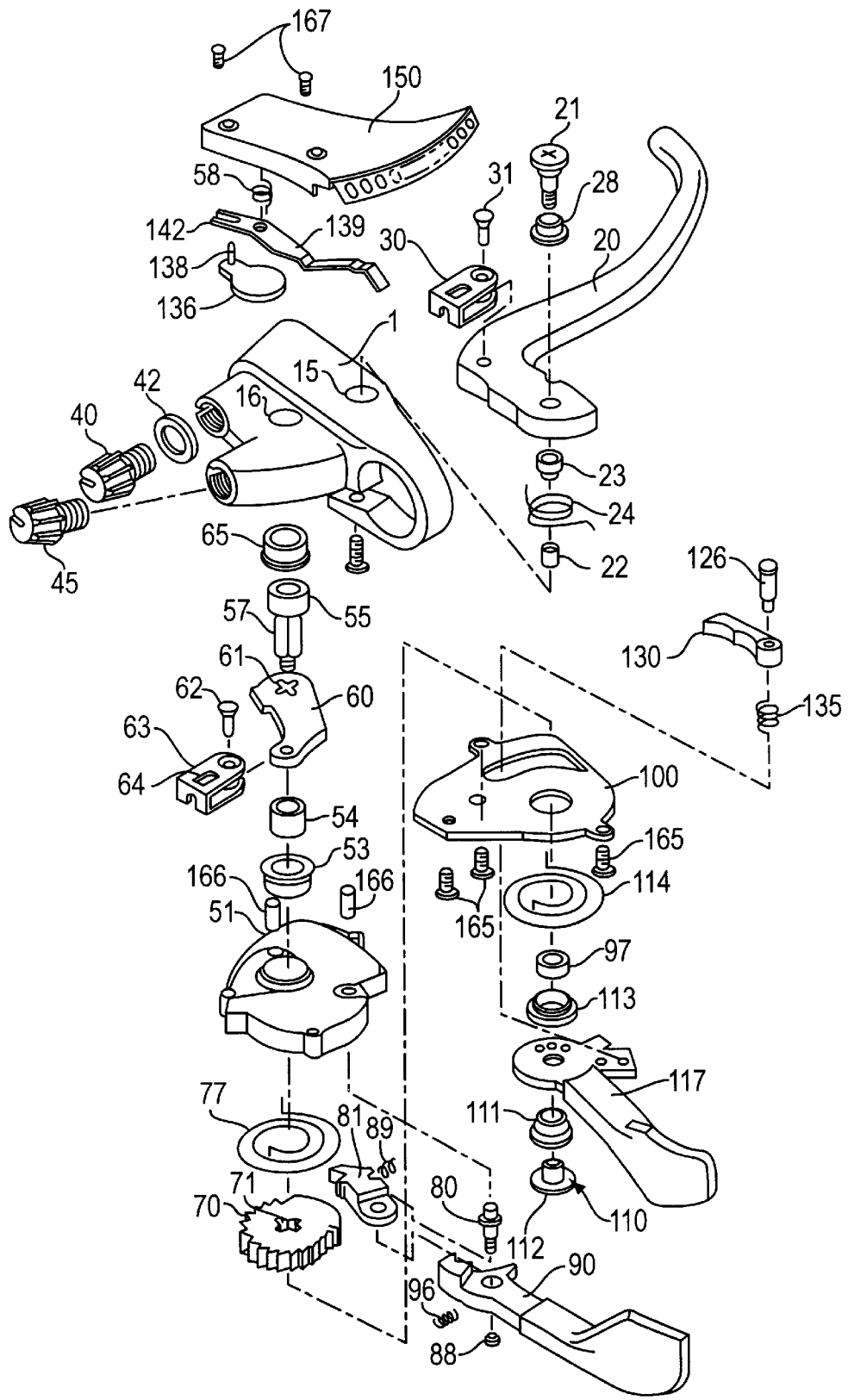
FIG. 22 is a detailed exploded view of the combined bicycle brake and shift device shown in FIG. 1.

The overall structure of a particular embodiment of a combined brake and shifting control device is shown in FIGS. 1–4, wherein FIG. 1 is a top plan view of the combined bicycle brake and shifting control device, FIG. 2 is a rear elevational view, FIG. 3 is a right side view, and FIG. 4 is a bottom view. Furthermore, FIG. 21 is a partially exploded view of the combined brake and shifting control device showing the major modular units of the device, and FIG. 22 is a detailed exploded view of the combined brake and shifting control device. These figures can be referred to for much of the discussion which follows, with reference to the remaining figures for a detailed description of the individual components as necessary.

As shown generally in FIGS. 1–4, the combined brake and shifting device comprises a brake unit 26, a shift unit 50, and an gear indicator 140. Brake unit 26 includes a brake bracket 1 having an upper surface 2, a brake lever 20, and a band unit 3 for fixing the assembly to a handlebar 12 or other structural member of a bicycle. Shift unit 50 includes a base 51 affixed to brake bracket 1 through positioning pins 166 (FIG. 21) and base lock screws 165, a return lever 90 for downshifting the bicycle transmission, and a feed lever 117 for upshifting the bicycle transmission. As shown in FIG. 21, shift it 50 includes a shift lever shaft 55 which projects outside base 51, and a cable hook 63 for attachment to a transmission cable such as a derailleur cable (not shown) is attached to shift lever shaft 55. As discussed in more detail below, shift lever shaft 55 rotates in response to movement of return lever 90 and feed lever 117 so that cable hook 63 may alternately release and pull the derailleur cable. When fixed to brake bracket 1, shift lever shaft 55 and cable hook 63 are disposed within brake bracket 1. As a result of this structure, shift unit 50 may be selectively attached or removed as a unit from brake bracket 1 for use on another brake and/or shifting device, and a different shift unit may be attached to brake bracket 1 as desired.

As shown more clearly in FIGS. 1 and 5(d), brake bracket 1 includes a female screw component 4 for receiving a well known brake cable adjusting bolt 40, and a female screw component 5 for receiving a well known derailleur cable adjusting bolt 45. Since these structures are integrally formed with the brake bracket, and since the brake bracket accommodates part of the shift unit 50 (namely, shift lever shaft 55 and cable hook 63), the resulting structure is more compact while retaining modularity and interchangeableness of the brake and shift units.

Gear indicator 140 includes a gear indicator cover 150, a lens 160 for viewing the currently selected gear, a display needle 139 (FIG. 21), and a cam plate 136. As discussed in more detail below, cam plate 136 communicates the motion of a shift lever shaft 55 of shift unit 50 to display needle 139 for indicating the currently selected gear. Gear indicator cover 150 is fixed to brake bracket 1 through lock screws 167.

Brake Unit

Figure 6:
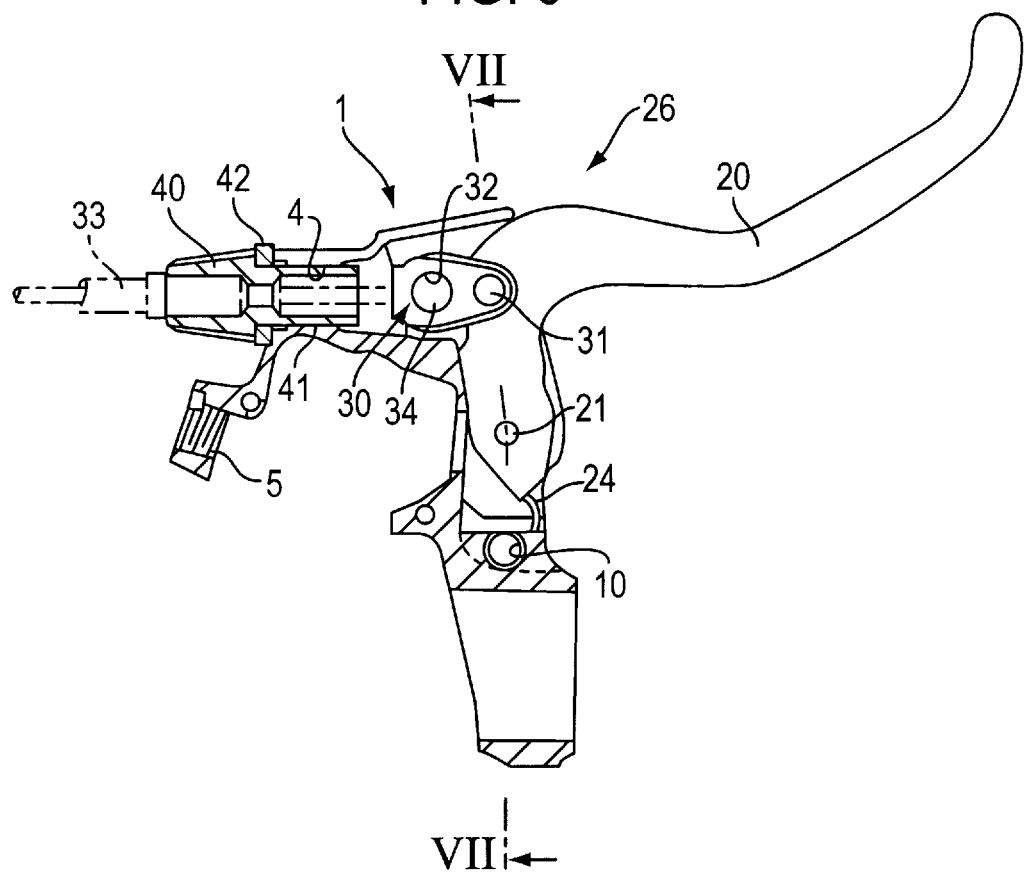
FIG. 6 is a cross sectional view of a particular embodiment of the brake unit shown in FIG. 1.
Figure 7:
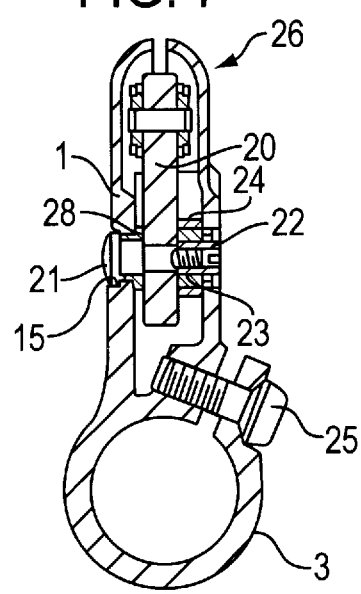
FIG. 7 is a cross sectional view taken along line VII—VII in FIG. 6.

FIG. 6 is a cross sectional view of brake unit 26 shown in FIG. 1, and FIG. 7 is a cross sectional view taken along line VII—VII in FIG. 6. Furthermore, FIGS. 5(a) through (f) illustrate in detail a particular embodiment of brake bracket 1, wherein FIG. 5(b) is an elevational view of the brake bracket; FIG. 5(a) is a left side view; FIG. 5(c) is a right side view; FIG. 5(d) is a cross sectional view taken along line d—d in FIG. 5(a); FIG. 5(e) is a cross sectional view taken along line e—e in FIG. 5(c); and FIG. 5(f) is a reverse view of the brake bracket. The exploded view of the combined brake and shifting unit in FIG. 22 also may facilitate understanding of the discussion which follows.

Brake bracket 1 is a light metal, the entirety of which is integrally formed. As noted above, brake bracket 1 consists of an upper surface 2 forming an external surface that is exposed to the outside, a band unit 3 for fixing the brake bracket to handlebar 12 (FIG. 1), a first female screw component 4 for receiving a brake cable adjusting bolt 40, and a second female screw component 5 for receiving a derailleur cable adjusting bolt 45. The band unit 3 is formed in the shape of a C as shown in FIG. 5(a). Part of the external periphery of band unit 3 forms an opening 6, and a round hole 7 in the interior of the band unit 3 has a nearly circular cross section. A through hole 9 is opened in the tip 8 of the band unit 3, and a screw hole 10 is formed in the surface 11 opposite the through hole 9, with the opening 6 serving as a gap between the through hole 9 and screw hole 10. A screw component at the leading end of a bolt 25 (FIG. 7) is inserted through the through hole 9 into the screw hole 10. Thus, when the bolt 25 is rotated, the tip 8 narrows the gap of the opening 6 as it is brought closer to the opening face 11, thus tightening the band unit 3 around the handlebar 12 of the bicycle so that the brake bracket 1 is clamped to the handlebar 12.

As shown more clearly in FIG. 5(a), the screw face of the first female screw component 4 is integrally formed with the inner peripheral face of the hole in the brake bracket 1, and a slit 13 is formed in the axial direction behind the position where the first female screw component is formed in the brake bracket 1. The second female screw component 5 is formed at an angle to the axis of, and is adjacent to, the first female screw component 4. The screw face of the second female screw component 5 also is integrally formed with the inner peripheral face of the hole in the brake bracket 1, and a slit 14 is formed in the axial direction to the position where the second female screw component 5 of the brake bracket 1 is formed.

As noted above, the first female screw component 4 receives a brake cable adjusting bolt 40 (FIG. 1), and the second female screw component 5 receives a derailleur cable adjusting bolt 45. The screw component 41 (FIG. 6) of the brake cable adjusting bolt 40 is screwed into the first female screw component 4. The brake cable adjusting bolt 40 moves the brake cables 33 (inner and outer) facing each other to adjust the position of the two relative to each other and to adjust the brake device. The structure of the brake cable adjusting bolt 40 is well known, and a detailed description of its structure will be omitted. A lock nut 42 is screwed into the screw component 41 of the brake cable adjusting bolt 40 and locks the brake cable adjusting bolt 40 and the brake bracket 1.

The screw component of the derailleur cable adjusting bolt 45 for adjusting the derailleur cable is similarly screwed into the second female screw component 5. Derailleur cable adjusting bolt 45 similarly moves the derailleur cables (inner and outer) facing each other to adjust their position relative to each other and to adjust the derailleur.

Two coaxial brake lever shaft insertion holes 15 (FIGS. 5(b) and 5(f)) are formed on the opposite surfaces of brake bracket 1. One hole supports the head of a brake lever shaft 21 (FIG. 21) through a brake shaft bushing 28, and the other hole supports the threaded component of the brake lever shaft 21 through a threaded cylindrical shaft 22. Brake lever 20 is swingably supported to brake bracket 1 through brake lever shaft 21. Base lock screw insertion holes 200 receive base lock screws 165, and positioning pin insertion holes 204 receive positioning pins 166.

A spring bushing 23 is fitted around the cylindrical shaft 22, and a return spring 24 is fitted and located around the spring bushing 23. One end of the return spring 24 is engaged at the side surface of the brake lever 20, and the other end is engaged at a spring engagement groove 18 (FIG. 5(c)) in brake bracket 1. The brake lever 20 is always energized by the spring force of the return spring 24 in the direction returning to the original angle position following braking operations.

A cable hook 30 (FIG. 6) is swingably located by means of a cable hook shaft 31 at the L-shaped corner of the brake lever 20. The cable hook 30 forms a roughly U-shaped configuration, and a through hole 32 is formed in the cable hook 30. A cable nipple 34 for the brake cable 33 is inserted into this through hole 32.

A shift lever shaft hole 16 for the insertion of the shift lever shaft 55 (in the manner implied in FIG. 22 and shown in FIG. 8) is formed through the opposite surfaces of bracket 1 roughly in the center of the bracket as shown in FIGS. 5(b) and 5(f), and a screw hole 17 is formed at an incline from the upper surface 2 of brake bracket 1 near the shift lever shaft hole 16. A grip adjusting bolt 27 (FIG. 1) is screwed through a grip adjusting plate (not shown in figure) into the screw hole 17, with the tip of grip adjusting bolt 27 in contact with the brake lever 20. The grip adjusting bolt 27 is turned for adjusting the operating angle position of the brake lever 20.

Shift Unit 50

As shown in FIGS. 2 and 3, shift unit 50 is attached to the brake bracket 1 of brake unit 26. In this embodiment, shift unit 50 is a unit for shifting the rear derailleur (not shown in figure) via a derailleur cable. Shift unit 50 can be attachably and detachably mounted as a previously assembled unit on the brake bracket 1. This unit functionality allows different types of shift units 50 to be mounted on the brake bracket 1. Also, shift unit 50 can also be mounted on different types of brake units 26 or brake brackets 1. Because the processes for assembling the brake unit 26 and shift unit 50 can be separate, the assembly process can be simplified and energy can be conserved.

FIG. 8 is a cross sectional view of the combined brake and shifting control device which illustrates details of construction of shift unit 50. The exploded view of the combined brake and shifting control device shown in FIG. 22 also may facilitate understanding of the discussion which follows. As noted above, shift unit 50 includes a base 51 affixed to brake bracket through positioning pins 166 (FIG. 21) and base lock screws 165, a return lever 90 for downshifting the bicycle transmission, and a feed lever 117 for upshifting the bicycle transmission. A ratchet 70 is coupled to return lever 90 and feed lever 117 through a positioning pawl 81 and a feeding pawl 130, respectively. Shift lever shaft 55 is attached to ratchet 70 for rotation therewith so that shift lever shaft 55 rotates in response to movement of return lever 90 and feed lever 117. As noted above, shift lever shaft 55 projects outside base 51, and a cable hook 63 for attachment to a transmission cable (not shown) is attached to shift lever shaft 55 so that the derailleur cable may be alternately released and pulled in response to operation of return lever 90 and feed lever 117. As shown in FIG. 8, shift lever shaft 55 and cable hook 63 are disposed within brake bracket I when shift unit 50 is mounted to brake bracket 1. A pawl board 100 covers the lower portion of base 51.

FIGS. 9(a)–9(d) illustrate the detailed structure of base 51. In this embodiment, base 51 is roughly in the form of a deformed circle with a concave cross section. The center of base 51 is provided with a bushing hole 52 into which is press fitted a bushing 53 (FIG. 8) and a spacer 54. In this embodiment bushing 53 is made of a lubricated sintered alloy. Shift lever shaft 55 is rotatably inserted through spacer 54 as shown in FIG. 8. Three lock screw holes 49 are formed in three locations around base 51 for receiving the base lock screws 165 (FIGS. 8 and 21) used to fasten shift unit 50 to brake bracket 1. Two positioning pin holes 59 for receiving positioning pins 166 (FIGS. 8 and 21) are formed near the lever shaft bushing holes 52 so that base 51 may be properly positioned relative to brake bracket 1. A positioning pawl shaft hole 76 is provided for fixedly receiving a positioning pawl shaft 80 (discussed below), and a return spring hole 78 is provided for receiving an end of a coiled return spring 77 (FIG. 22) for ratchet 70.

Figure 12:
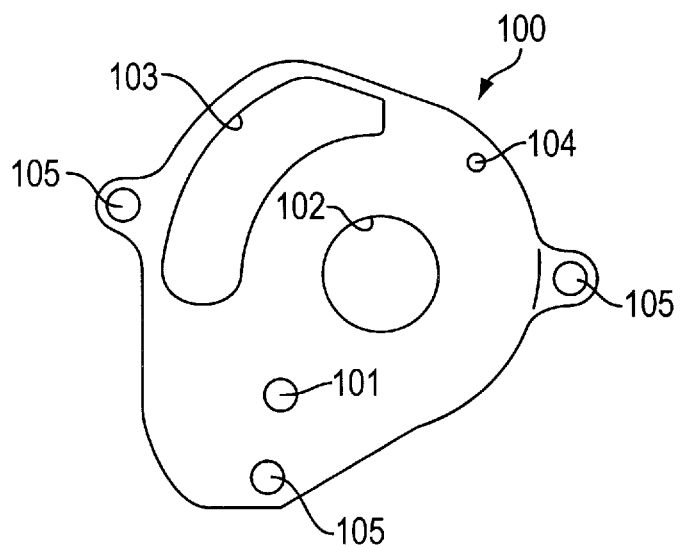
FIG. 12 is an elevational view of a particular embodiment of a pawl plate shown in FIG. 8.

FIG. 12 is a plan view of the pawl board 100 which covers the open side of base 51. Pawl board 100 is made of sheet metal and is attached to base 51 through the same lock screws 165 used to secure base 51 to brake bracket 1. These screws extend through holes 105 formed in the outer periphery of pawl board 100. A center hole 102 for supporting the shift lever shaft 55 is located in the center of the pawl board 100, an arcuate hole 103 for accommodating the swinging motion of a feeding pawl shaft 126 (FIG. 8) is formed at the outer periphery of pawl board 100, and a hole 101 is provided for receiving the opposite end of positioning pawl shaft 80. A spring engaging hole 104 is provided for engaging one end of a feeding lever spring 114 (FIG. 22). These structures will be discussed in more detail below.

FIGS. 10(a) and (b) illustrate shift lever shaft 55, wherein FIG. 10(a) is a partial cross sectional view of shift lever shaft 55, and FIG. 10(b) is a cross sectional view of shift lever shaft 55 taken along line b—b in Figure (a). In this embodiment, shift lever shaft 55 comprises a drum portion 57 having a cross-shaped cross section, a threaded portion 56 formed at one end, and a cam joint hole 58 with a hexagonal cross section formed in the head at the other end. Since the outer periphery of the drum component 57 is in the form of a cylinder, the shift lever shaft 55 is rotatably supported in base 51 by the spacer 54. When shift unit 50 is mounted to brake bracket 1, the head of shift lever shaft 55 is rotatably supported by a bushing 65 fitted in the shift lever shaft hole 16 formed in brake bracket 1.

A winding plate 60 made of sheet metal is fitted at a location near the head of the drum component 57. Winding plate 61 has a cross-shaped through hole 61 which meshes with the cross-shaped section of drum portion of shift lever shaft 55 so that winding plate 60 and shift lever shaft 55 rotate as a unit. A generally U-shaped cable hook 63 is rotatably coupled to a radially outward end of a winding plate 61 through a cable hook shaft 62. Cable hook 63 has the same structure as cable hook 30 for brake cable 33. A through hole 64 is formed in the cable hook 63 for receiving a nipple of a derailleur cable (not shown in figure). Thus, when shift lever shaft 55 rotates, cable hook 63 rotates for pulling and releasing the derailleur cable.

Figures 11A, 11B:
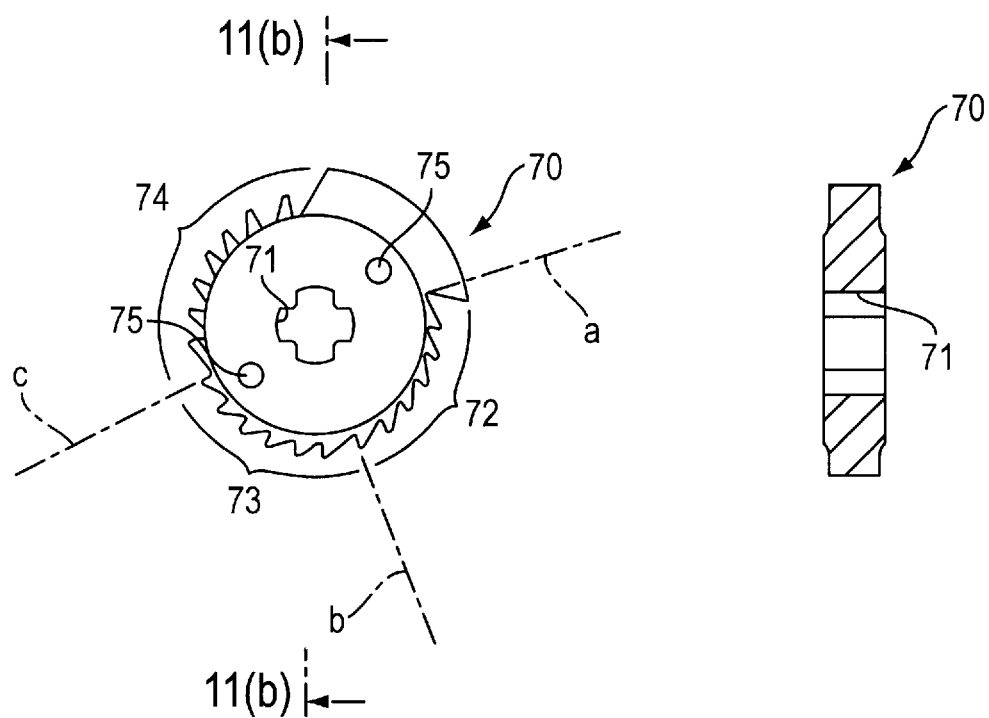
FIG. 11(a) is an elevational view of the ratchet.
FIG. 11(b) is a cross sectional view of the ratchet taken along line 11(b)—11(b) in FIG. 11(a)

FIGS. 11(a) and (b) illustrate ratchet 70, wherein FIG. 11(a) is an elevational view of ratchet 70 and FIG. 11(b) is a cross sectional view of ratchet 70 taken along line b—b in FIG. 11(a). As shown in FIG. 11(a), a cross-shaped through hole 71 is formed in ratchet 70 for meshing with the cross-shaped drum component 57 of shift lever shaft 55 so that ratchet 70 and shift lever shaft 55 rotate as a unit. A return spring hole 75 is provided for receiving one end of return spring 77 (FIG. 22). As noted above, the other end of return spring 77 is fitted in return spring hole 78 (FIG. 9(a)) in base 51. As a result, ratchet 70 is always biased so that it rotates in one direction around the shift lever shaft 55. Six feeding teeth 72, seven positioning teeth 73, and seven return teeth 74 are formed around the ratchet 70. The first and last teeth are used as one stage, so the ratchet 70 in this embodiment involves the use of 8 stages. The feeding teeth 72 begin at point a, the positioning teeth 73 begin at point b, and the return teeth 74 begin at point c.

As noted above, return lever 90 and feed lever 117 are coupled to ratchet 70 through a positioning pawl 81 and a feeding pawl 130. The structure of these levers and pawls, and how they are connected together in the shifting unit, will now be discussed.

One end of positioning pawl shaft 80 is fixed in the positioning pawl shaft hole 76 (FIG. 9(a)) in base 51, and the other end of positioning pawl shaft 80 is inserted into hole 101 of pawl board 100 where it is fixed with an E-shaped retaining ring 88. Thus, positioning pawl shaft 80 is firmly and securely fixed at both ends at the base 51 and pawl board 100. Return lever 90 and positioning pawl 81 are fitted on positioning pawl shaft 80.

Figure 13A:
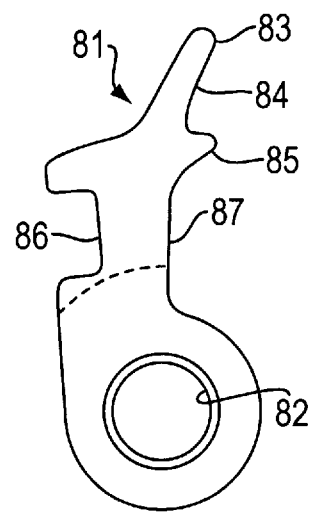
Figure 13B:
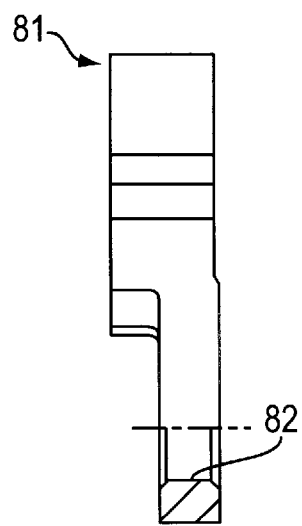
FIG. 13(b) is a partial cross sectional view of the positioning pawl.

FIG. 13(a) and (b) illustrate the detailed structure of positioning pawl 81. One end of the positioning pawl 81 has a through hole 82 for rotatably fitting positioning pawl on positioning pawl shaft 80. The other end of positioning pawl 81 has a feed pawl contact component 83. As discussed in more detail below, feed pawl contact component 83 is intended to come into contact with the feeding pawl 130 to undo the engagement between feeding pawl 130 and feeding teeth 72 of ratchet 70 (see FIG. 20(c)). Positioning pawl 81 further includes a ratchet contact component 84 for contacting with the ratchet 70. The ratchet contact component 84 has a curvature virtually identical to the outer diameter of the ratchet 70 and ordinarily is in contact with the outer periphery of the positioning teeth 73 of the ratchet 70. An engaging tooth 85 protrudes from the ratchet contact component 84 for engaging the positioning teeth 73 of the ratchet 70, and a concave spring receiving component 86 is formed on the reverse side of the engaging tooth 85. A spring 89 (FIG. 22) is fitted between the spring receiving component 86 and base 51 for biasing the positioning pawl 81 into the ratchet 70. A return lever contact component 87 is formed on the opposite side of the spring receiving component 86. A positioning pawl contact component 93 of return lever 90 (FIG. 14) presses against return lever contact component 87 for disengaging positioning pawl 81 from ratchet 70 in a manner discussed below.

FIGS. 14(a) and (b) illustrate a particular embodiment of return lever 90, wherein FIG. 14(a) is an elevational view of the return lever, and FIG. 14(b) is a cross sectional view of the return lever taken along line b—b in FIG. 14(a). Return lever 90 has a through hole 91 for rotatably fitting return lever 90 on positioning pawl shaft 80. A trigger tooth 92 is integrally formed at one end of the return lever 90 for engaging with the inclined tooth surface of the return teeth 74 of the ratchet 70 and for allowing ratchet 70 to rotate in reverse when trigger tooth 92 is disengaged from return teeth 74. A positioning pawl contact component 93 is formed on a side of return lever 90 for pressing against the return lever contact component 87 of positioning pawl 81 so as to disengage the engaging tooth 85 of positioning pawl 81 from the positioning teeth 73 of the ratchet 70 in the manner shown in FIG. 20(c). A handle 95 is inserted onto and integrally fixed to the other end 94 of the return lever 90. The handle 95 facilitates finger tactility during operation. A spring 96 (FIG. 22) is disposed between base 51 and return lever 90 for biasing trigger tooth 92 toward ratchet 70.

FIGS. 15(a) through (e) illustrate the details of construction of feeding lever 117, wherein FIG. 15(a) is an elevational view, FIG. 15(b) is a right side view, FIG. 15(c) is a reverse view, FIG. 15(d) is a left side view, and FIG. 15(e)

is a cross sectional view taken along line e—e in FIG. 15(b). Feed lever 117 includes a feeding lever plate 115 fixed to a feeding lever handle 116. Feeding lever plate 115 has a shaft hole 118 so that feeding lever 117 may be rotatably fitted to shift lever shaft 55 through a feeding lever bushing 110 (FIGS. 8 and 22) and a bushing 111. Feeding lever bushing 110 includes a threaded hole 98 (FIG. 8) for screwing through a tubular spacer 97 onto the threaded portion 56 of shift lever shaft 55. Bushing 111 is fitted around the feeding lever bushing 110 (see FIG. 8), and a head 112 of feed lever bushing 110 retains feeding lever 117 in place.

Feeding lever plate 115 also includes a hole 119 in which is fixed one end of a feeding pawl shaft 126 (FIG. 22). A feeding pawl 130 is rotatably supported on feeding pawl shaft 126 and is biased toward ratchet 70 by a spring 135. When assembled, feeding lever 117 is covered by a feeding lever cover 120 (FIG. 4) which is fastened to feeding lever 117 by a screw 121 which threads into a threaded hole 125 in feeding lever plate 115.

Figure 16A:
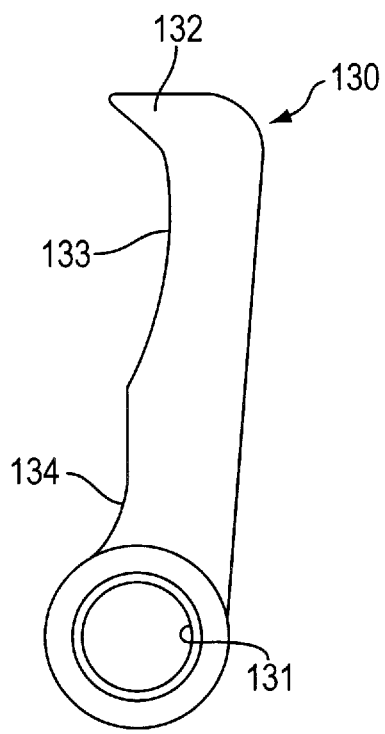
Figure 16B:
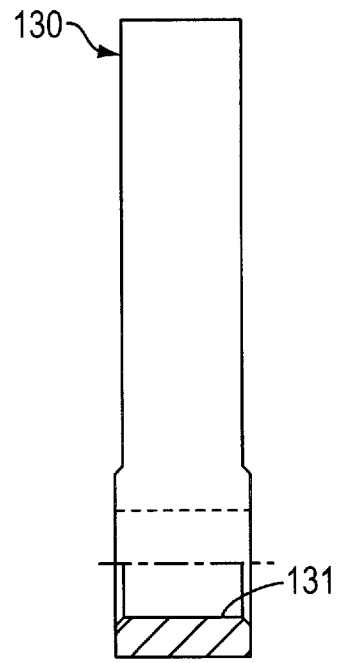
FIG. 16(b) is, a side view of the feeding pawl.

FIGS. 16(a) and (b) show the detailed structure of feeding pawl 130, wherein FIG. 16(a) is an elevational view of feeding pawl 130, and FIG. 16(b) is a side view of feeding pawl 130. One end of feeding pawl 130 has a hole 131 for rotatably fitting feeding pawl 130 on feeding pawl shaft 126, and the other end of feeding pawl 130 includes a tooth 132 for engaging the feeding teeth 72 of ratchet 70. An arcuate ratchet contact surface 133 is formed at a location near the feeding tooth 132 for guiding the feeding pawl 130 in contact with the outer periphery of the ratchet 70. Another arcuate positioning tooth contact surface 134 is formed adjacent to the ratchet contact surface 133 for contacting the feeding pawl contact component 83 (FIG. 13(a)) of the positioning pawl 81. The feeding pawl contact component 83 presses against positioning tooth contact surface 134 for disengaging the feeding tooth 132 from the feeding teeth 72 of the ratchet 70 as shown in FIG. 20(c).

Figure 20A:
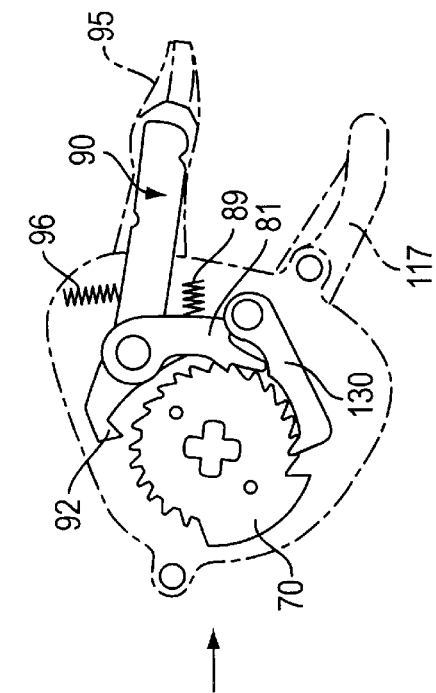
FIGS. 20(a) through (d) illustrate the operation of the shift unit, wherein FIGS. 20(a) and (b) illustrate operations during upshifting (low to high speed), and FIGS. 20(c) and (d) illustrate operations during down shifting (high to low speed)
Figure 20B:
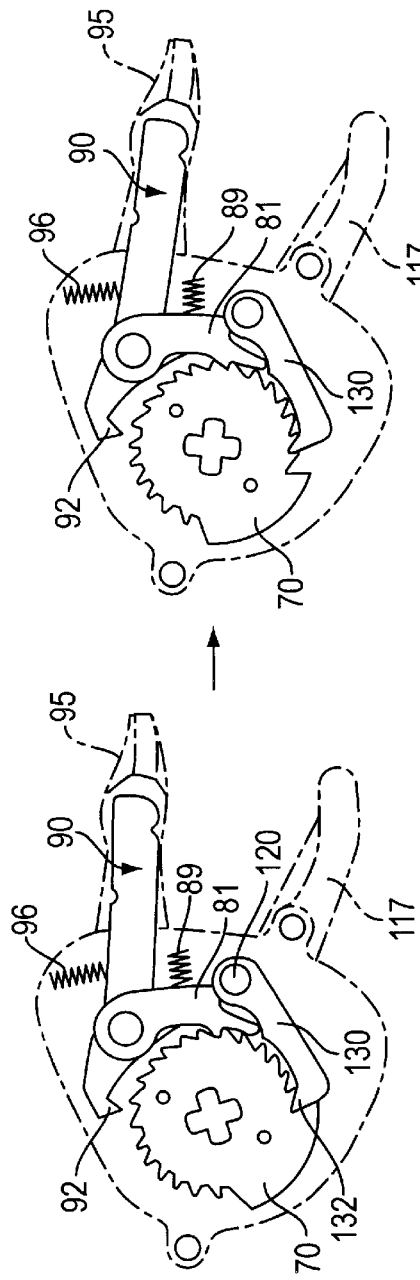
Figure 20C:
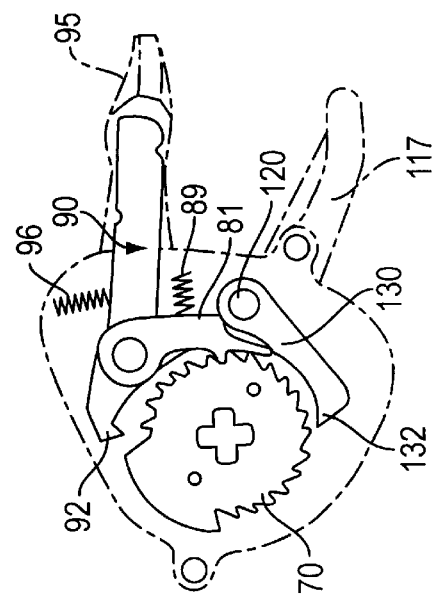
Figure 20D:
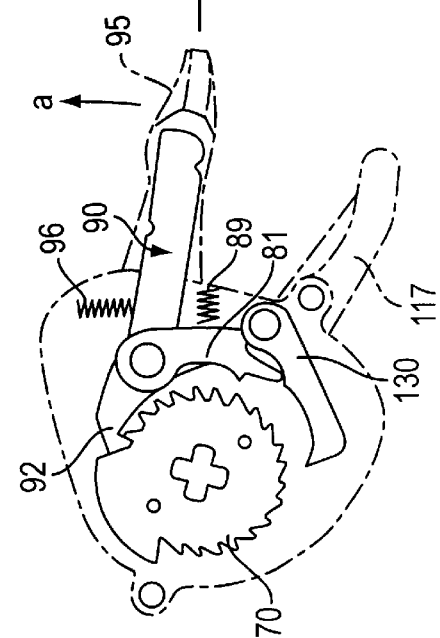

FIGS. 20(a) through (d) illustrate the operation of the shift unit, wherein FIGS. 20(a) and (b) illustrate operations during upshifting (low to high speed), and FIGS. 20(c) and (d) illustrate operations during down shifting (high to low speed). First, operation of a rear derailleur from first gear to second gear will be described. FIGS. 20(a) and (b) illustrate the operation of the shift unit 50 at this time.

When the feeding lever 117 is first pressed with the thumb, it pivots on the shift lever shaft 55, causing the feeding pawl shaft 126 and feeding pawl 130 to swing. This swinging causes the feeding tooth 132 of the feeding pawl 130 to press against the feeding teeth 72 of the ratchet 70 so as to rotate the ratchet 70 from the state shown in FIG. 20(a) to the state shown in FIG. 20(b). At this time the engaging tooth 85 of the positioning pawl 81 engages the next positioning tooth 73 of the ratchet 70 for maintaining ratchet 70 in the position shown in FIG. 20(b). As ratchet 70 rotates, shift lever shaft 55 rotates accordingly and cable hook 63 pulls the inner cable of the derailleur cable. Upshifting to the other gears occurs in the same manner until the shift unit is in the eighth gear position.

The operation of shift unit 50 when shifting down from eighth gear to seventh gear will now be described with reference to FIGS. 20(c) and (d). When the handle 95 of the return lever 90 is swung in the direction (a) indicated in FIG. 20(a), the trigger tooth 92 of the return lever 90 contacts with the return teeth 74 of the ratchet 70 to prevent uncontrolled movement of ratchet 70. At the same time, positioning pawl contact component 93 of return lever 90 presses against return lever contact component 87 of positioning pawl 81 for disengaging engaging tooth 85 from ratchet 70. Similarly, feed pawl contact component 83 of positioning pawl 81 presses against feeding pawl 130 to disengage tooth 132 from ratchet 70. When return lever 90 is released, ratchet 70 moves by one position tooth to the position shown in FIG. 20(d) as a result of the biasing action of return spring 77, whereupon engaging tooth 85 of positioning pawl 81 maintains ratchet 70 in this position until further operation of feeding lever 117 or return lever 90.

Indicator 140

As noted above, gear indicator 140 includes a gear indicator cover 150 (FIG. 21), a lens 160 for viewing the currently selected gear, a display needle 139, and a cam plate 136. Gear indicator cover 150 is fixed to brake bracket 1 through lock screws 167. Cam plate 136 communicates the motion of a shift lever shaft 55 of shift unit 50 to display needle 139 for indicating the currently selected gear. In this embodiment, the indicator 140 can indicate seven shifting stages.

Figure 17A:
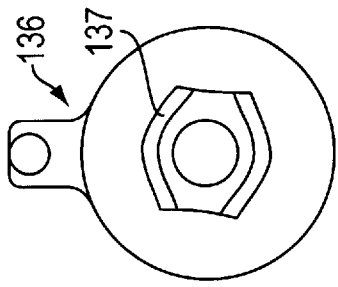
Figure 17B:
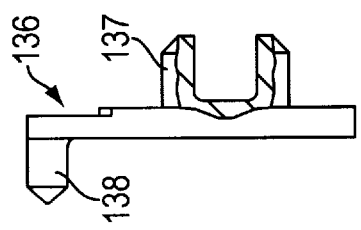
FIG. 17(b) is a right side view of the cam plate shown in FIG. 17(a)
Figure 17C:
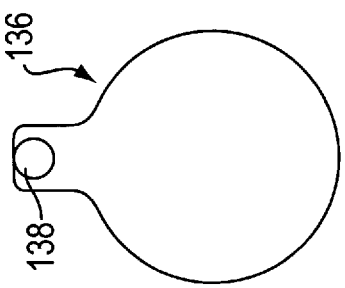
FIG. 17(c) is a rear view of the cam plate shown in FIG. 17(a)

FIGS. 17(a), (b), and (c) illustrate the detailed structure of cam plate 136, wherein FIG. 17(a) is a plan view, FIG. 17(b) is a right side view, and FIG. 17(c) is a rear view. Cam plate 136 has a joint 137 on one side and a shaft 138 on the opposite side. When indicator 140 is mounted to brake bracket 1, joint 137 is inserted into cam joining hole 58 (see FIG. 10) at the top end of the shift lever shaft 55. Joint 137 consists of two components with an L-shaped cross section. The outer diameter of joint 137 is somewhat larger than that of the cam joining hole 58 so that joint 137 can be fixed merely by pinching the two components upon insertion in to cam joining hole 58. Thus, cam plate 136 rotates together with shift lever shaft 55.

FIGS. 18(a) and (b) illustrate the details of display needle 139, wherein FIG. 18(b) is an elevational view of display needle 139, and FIG. 18(a) is a side view of the display needle 139. Display needle 139 is made of a bent member. A shaft hole 141 is formed in display needle 139 so that display needle 139 may be rotatably fitted to a shaft 151 (FIG. 19) on cover 150. A slit 142 is formed at one end of display needle 139 for receiving shaft 133 of the cam plate 131. Thus, display needle 139 swings when cam plate 131 swings.

The center 143 of the display needle 139 is bent at an angle $\theta_1$. In an assembled state, the tip 144 is further bent to $\theta_2$. The tip surface 145 of the tip 144 is coated with a pink paint containing a fluorescent agent. The shift position is indicated from the lens 160 of the cover 150 by the indicator at the tip surface 145 of the display needle 139.

FIGS. 19(a), (b), and (c) illustrate the detailed construction of cover 150, wherein FIG. 19(c) is a plan view of the cover, FIG. 19(a) is a reverse view of the cover, and FIG. 19(b) is a cross sectional view taken along line b—b in FIG. 19(a). In this embodiment cover 150 is made of a synthetic resin. As noted above, the shaft 151 on the underside of cover 150 is inserted into the shaft hole 141 of the display needle 139 for rotatably supporting display needle 139.

Cover 150 has two lock screw holes 152. Lock screws 167 are inserted into these lock. screw holes 152 for fixing cover 150 to brake bracket 1. Lens attachment holes 154 for attaching the lens 160 are provided in two locations on the front of cover 150 for attaching lens 160. Cover 150 extends from the back end toward the front end thereof in a gradually upward-facing curve 153. Curve 153 allows the indicator 140 to be located on the bicycle handlebar when it is attached to the bicycle, and allows the gear position of the rear derailleur to be viewed at a glance.

While the above is a description of various embodiments of the present invention, further modifications may be employed without departing from the spirit and scope of the present invention. Thus, the scope of the invention should not be limited by the specific structures disclosed. Instead, the true scope of the invention should be determined by the following claims. Of course, although labeling symbols are used in the claims in order to facilitate reference to the figures, the present invention is not intended to be limited to the constructions in the appended figures by such labeling.

What is claimed is:

1. A combined bicycle brake and shifting device comprising:
   a brake lever housing (1);
   a brake lever (20) pivotably coupled to the brake lever housing (1) for rotation around a brake lever axis to operate a braking device;
   a shift unit (50) including:
      a speed change housing (51);
      a ratchet mechanism (70) disposed within the speed change housing (51);
      a shift lever (90,117) coupled to the ratchet mechanism (70) so that the ratchet mechanism (70) rotates in response to movement of the shift lever (90,117); and
      a shaft (55) coupled to the ratchet mechanism (70) for rotation around a shaft axis parallel to the brake lever axis in response to rotation of the ratchet mechanism (70) and extending outside the speed change housing (51) into the brake lever housing (1), the shift lever shaft (55) having a wire winding member (60) disposed thereon within the brake lever housing (1).

2. The device according to claim 1 wherein the brake lever housing comprises:
   a band (3) for fixing the brake lever housing (1) to a bicycle;
   a first screw component (4) for fixing a brake cable adjusting bolt (40) to the brake lever housing (1); and
   a second screw component (5) for fixing a transmission cable adjusting bolt (45) to the brake lever housing (1).

3. The device according to claim 1 wherein the means for attaching and detaching the shift unit (50) includes a fastener (165) extending through the speed change housing (51) and into the brake lever housing (1).

4. The device according to claim 1 further comprising means for attaching and detaching the shift unit (50) from the brake lever housing (1) so that the speed change housing (51), the ratchet mechanism (70), the shift lever (90,117) and the shaft (55) can remain assembled to each other when the shift unit is detached from the brake lever housing (1).

5. A combined bicycle brake and shifting device comprising:
   a brake lever housing (1);
   a brake lever (20) pivotably coupled to the brake lever housing (1) for rotation around a brake lever axis to operate a braking device;
   a shift unit (50) including:
      a speed change housing (51) immovably mounted to the brake lever housing (1);
      a ratchet mechanism (70) disposed within the speed change housing (51);
      a shift lever (90,117) coupled to the ratchet mechanism (70) so that the ratchet mechanism (70) rotates in response to movement of the shift lever (90,117); and
      a shaft (55) coupled to the ratchet mechanism (70) for rotation around a shaft axis parallel to the brake lever axis in response to rotation of the ratchet mechanism (70) and extending outside the speed change housing (51) into the brake lever housing (1), the shift lever shaft (55) having a wire winding member (60) disposed thereon within the brake lever housing (1).

6. The device according to claim 5 wherein the speed change housing (51) is mounted to an external side of the brake lever housing (1).

7. The device according to claim 6 wherein the speed change housing (51) is disposed entirely external to the brake lever housing (1).

8. The device according to claim 5 further comprising a fastener (165) extending through the speed change housing (51) and into the brake lever housing (1) for mounting the speed change housing (51) to the brake lever housing (1).

9. The device according to claim 8 wherein the fastener (165) comprises a screw.

10. A combined bicycle brake and shifting device comprising:
    a brake lever housing (1);
    a brake lever (20) pivotably coupled to the brake lever housing (1) for rotation around a brake lever axis to operate a braking device;
    a shift unit (50) including:
       a speed change housing (51);
       a ratchet mechanism (70) disposed within the speed change housing (51);
       a shift lever (90,117) coupled to the ratchet mechanism (70) so that the ratchet mechanism (70) rotates in response to movement of the shift lever (90,117);
       a shaft (55) coupled to the ratchet mechanism (70) for rotation around a shaft axis parallel to the brake lever axis in response to rotation of the ratchet mechanism (70) and extending outside the speed change housing (51) into the brake lever housing (1), the shift lever shaft (55) having a wire winding member (60) disposed thereon within the brake lever housing (1); and
       a fastener (165) separate from the shaft (55) for mounting the speed change housing (51) to the brake lever housing (1).

11. The device according to claim 10 wherein the fastener (165) extends through the speed change housing (51) to the brake lever housing (1).

12. The device according to claim 11 wherein the fastener (165) extends into the brake lever housing (1).

13. The device according to claim 12 wherein the fastener (165) comprises a screw.

14. A combined bicycle brake and shifting device comprising:
    a brake lever housing (1);
    a brake lever (20) pivotably coupled to the brake lever housing (1);
    a speed change housing (51);
    a ratchet mechanism (70) disposed within the speed change housing (51);
    a shift lever (90,117) coupled to the ratchet mechanism (70) so that the ratchet mechanism (70) rotates in response to movement of the shift lever (90,117);
    a shaft (55) coupled to the ratchet mechanism (70) for rotation therewith and extending outside the speed change housing (51) into the brake lever housing (1), the shift lever shaft (55) having a wire winding member (60) disposed thereon within the brake lever housing (1);
    an indicator cover (150) mounted to an opposite side of the brake lever housing (1), the indicator cover (150)

having an indicator cover projection (151) extending toward the brake lever housing (1);

a display needle (139) pivotably coupled to the indicator cover projection (151), the indicator needle (139) having a slit (142) on one end thereof;

a cam plate (136) for transferring rotational motion of the shaft (55) to the indicator needle (139), the cam plate (136) including:

a shaft coupler (137) extending from one side thereof and coupled to the shaft (55) for rotation therewith; and an indicator coupler (138) extending from an opposite side thereof and fitted within the slit (142) on the indicator needle (139).

15. A combined bicycle brake and shifting device comprising:

a brake lever housing (1);

a brake lever (20) pivotably coupled to the brake lever housing (1) for rotation around a brake lever axis to operate a braking device;

a shift unit (50) including:

a speed change housing (51);

a ratchet mechanism (70) disposed within the speed change housing (51);

a return lever (90) coupled to the ratchet mechanism (70) so that the ratchet mechanism (70) rotates in response to movement of the return lever (90);

a feed lever (117) coupled to the ratchet mechanism (70) so that the ratchet mechanism (70) rotates in response to movement of the feed lever (117);

a shaft (55) coupled to the ratchet mechanism (70) for rotation around a shaft axis parallel to the brake lever axis in response to rotation of the ratchet mechanism (70) and extending outside the speed change housing (51) into the brake lever housing (1), the shift lever shaft (55) having a wire winding member (60) disposed thereon within the brake lever housing (1).

16. The device according to claim 15 wherein the brake lever housing comprises:

a band (3) for fixing the brake lever housing (1) to a bicycle;

a first screw component (4) for fixing a brake cable adjusting bolt (40) to the brake lever housing (1); and a second screw component (5) for fixing a transmission cable adjusting bolt (45) to the brake lever housing (1).

17. The device according to claim 15 wherein the means for attaching and detaching the shift unit (50) includes a fastener (165) extending through the speed change housing (51) and into the brake lever housing (1).

18. The device according to claim 15 further comprising means for attaching and detaching the shift unit (50) from the brake lever housing (1) so that the speed change housing (5l), the ratchet mechanism (70), the shift lever (90,117) and the shaft (55) can remain assembled to each other when the shift unit is detached from the brake lever housing (1).

19. A combined bicycle brake and shifting device comprising:

a brake lever housing (1);

a brake lever (20) pivotably coupled to the brake lever housing (1);

a speed change housing (51);

a ratchet mechanism (70) disposed within the speed change housing (51);

a return lever (90) coupled to the ratchet mechanism (70) so that the ratchet mechanism (70) rotates in response to movement of the return lever (90);

a feed lever (117) coupled to the ratchet mechanism (70) so that the ratchet mechanism (70) rotates in response to movement of the feed lever (90);

a shaft (55) coupled to the ratchet mechanism (70) for rotation therewith and extending outside the speed change housing (51) into the brake lever housing (1), the shift lever (55) having a wire winding member (60) disposed thereon within the brake lever housing (1);

an indicator cover (150) mounted to an opposite side of the brake lever housing (1), the indicator cover (150) having an indicator cover projection (151) extending toward the brake lever housing (1);

a display needle (139) pivotably coupled to the indicator cover projection (151), the indicator needle (139) having a slit (142) on one end thereof;

a cam plate (136) for transferring rotational motion of the shaft (55) to the indicator needle (139), the cam plate (136) including:

a shaft coupler (137) extending from one side thereof and coupled to the shaft (55) for rotation therewith; and an indicator coupler (138) extending from an opposite side thereof and fitted within the slit (142) on the indicator needle (139).

20. A combined bicycle brake and shifting device comprising:

a brake lever housing (1);

a brake lever (20) pivotably coupled to the brake lever housing (1) for rotation around a brake lever axis to operate a braking device;

a speed change housing (51);

a ratchet mechanism (70) disposed within the speed change housing (51);

a return lever (90) coupled to the ratchet mechanism (70) so that the ratchet mechanism (70) rotates in response to movement of the return lever (90);

a feed lever (117) coupled to the ratchet mechanism (70) so that the ratchet mechanism (70) rotates in response to movement of the feed lever (90);

a shaft (55) coupled to the ratchet mechanism (70) for rotation around a shaft axis parallel to the brake lever axis in response to rotation of the ratchet mechanism (70) and extending outside the speed change housing (51) into the brake lever housing (1), the shift lever shaft (55) having a wire winding member (60) disposed thereon within the brake lever housing (1);

wherein the ratchet mechanism (70) includes:

an opening (71) for receiving the shaft (55) therethrough so that the shaft (55) rotates together with the ratchet mechanism;

a plurality of feeding teeth (72) disposed on an outer periphery thereof;

a plurality of positioning teeth (73) disposed on an outer periphery thereof; and a plurality of return teeth (74) disposed on an outer periphery thereof.

21. The device according to claim 20 wherein the return lever (90) includes a trigger tooth (92) for selectively engaging the plurality of return teeth (74), and further comprising:

a positioning pawl (81) for selectively coupling the return lever (90) to the plurality of positioning teeth (73); and a feeding pawl (130) for selectively coupling the feeding lever (117) to the plurality of feeding teeth (72).

* * * * *